United States Patent [19]

Freethy

[11] 3,925,619

[45] Dec. 9, 1975

[54] APPARATUS FOR TRANSMITTING INFORMATION REGARDING MONETARY TRANSACTIONS

[76] Inventor: Ralph Charles Freethy, Barnhay House, Barnhay, Churchdown, Gloucester, England

[22] Filed: Mar. 25, 1974

[21] Appl. No.: 454,767

[52] U.S. Cl. .................................. 179/6.3 R; 194/10

[51] Int. Cl.² ........................................... G07G 5/00

[58] Field of Search .......... 179/6.3 R, 6.4, 6.31, 6.5, 179/2 A, 2 CA; 194/10, 16, 9 R; 340/203, 206

[56] References Cited

UNITED STATES PATENTS

| | | | |
|---|---|---|---|
| 3,116,370 | 12/1963 | Anoregg et al. | 179/6.3 R |
| 3,423,533 | 1/1969 | Barge | 179/6.5 |
| 3,487,905 | 1/1970 | James, Sr. | 194/10 |
| 3,496,300 | 2/1970 | Stokes | 179/6.3 R |
| 3,499,117 | 3/1970 | Clark, Jr. | 179/6.3 R |
| 3,770,089 | 11/1973 | Verduin et al. | 194/10 |

*Primary Examiner*—Kathleen H. Claffy
*Assistant Examiner*—Gerald L. Brigance
*Attorney, Agent, or Firm*—Young & Thompson

[57] ABSTRACT

A combination of apparatus for enabling monetary transactions, such as telephoned betting instructions, to be transmitted over a distance comprises a plurality of local stations and a main station at which the transactions will be recorded and/or displayed. Each local station apparatus comprises a cash accepting and validating device, an encoding signal generator arranged to produce a different set signal for each cash value to be transmitted, and an information transmitter arranged for transmitting the set signals to an output thereof. The main station apparatus comprises output means and input means through which signals may be transmitted respectively to and from each local station, and a synchronising signal generator for producing clock pulses for transmission to the local stations, and each local station also includes means responsive to the clock pulses and arranged to control the timing of the set signals as produced by the encoding signal generator. The main station additionally includes a decoder for decoding signals produced by a local station apparatus, and received at the input means and a data indicating device.

13 Claims, 4 Drawing Figures

APPARATUS FOR TRANSMITTING INFORMATION REGARDING MONETARY TRANSACTIONS

This invention relates to apparatus designed particularly though not exclusively for "placing" bets at positions remote from a betting office. The apparatus may, however, be applicable generally to any form of monetary transaction, such as the issuance of temporary insurance policies, travel tickets, or the payment of bills.

Owing to existing restrictions on the "placing" of bets by telephone, this method is not generally used to any great extent, but on the other hand it is often inconvenient or impossible for a punter to visit a betting office during working hours, and it is one object of the invention to provide apparatus which will provide the advantages of a telephone betting service without contravening the existing credit restrictions.

The invention consists in the combination of apparatus for enabling monetary transactions to be transmitted from a plurality of local stations to a main station and recorded and/or displayed thereat, wherein each local station apparatus comprises a cash accepting and validating device, an encoding signal generator arranged to produce a different set signal for each cash value to be transmitted, and an information transmitter arranged for transmitting the set signals to an output and wherein the main station apparatus comprises output means and input means through which signals may be transmitted respectiviely to and from each local station, and a synchronising signal generator for producing clock pulses for transmission to the local stations, each said local station including means responsive to said clock pulses and arranged to control the timing of the set signals as produced by the encoding signal generator and/or the information transmitter of a local station apparatus, said main station including a decoder for decoding signals produced by a local station apparatus, and received at the input means and a recording and/or display device.

In the preferred embodiment, the synchronising signal generator is adapted to produce signals for controlling the acceptance or rejection of cash inserted into the cash acceptor device of a local station apparatus. It is also desired to include interface circuits between the information transmitter and the output of each local station apparatus and between the output means and the synchronising signal generator of the main station apparatus, for protection of the communications link.

Preferably the cash acceptor includes a bank note acceptor, and the apparatus may include a cash totaliser arranged to sum the value of the cash accepted to produce a total cash signal from the encoding signal generator.

In any case the local station will usually include an automatic selector code signal generator, for use with a telephone exchange in the link, to connect the local station to the main station through the exhange, and the local station also preferably includes a telephone receiver and microphone. Means may be provided for automatically de-energizing or disconecting the receiver and/or microphone when the cash encoding signal generator is in operation.

According to another possible feature of the invention the local station includes a dial or press button or punched card information signal generator for transmitting information regarding the transaction, and the local station may also include a dispenser for receipts, and means for energising the dispenser in response to signals from the cash acceptor or from the main station, or from a manual switch.

Preferably the local station includes an alarm system couples to a detector at the local station, to provide an alarm signal of an unauthorized attempt is made to open the cash section of the cash acceptor.

According to another preferred feature of the invention the main station includes a telephone and/or taperecorder system and/or print-out mechanism and/or automatic cash signal decoder.

The invention may be performed in various ways and one specific embodiment with a number of possible modifications will now be described by way of example with reference to the accompanying drawings, in which.

Figure 1:
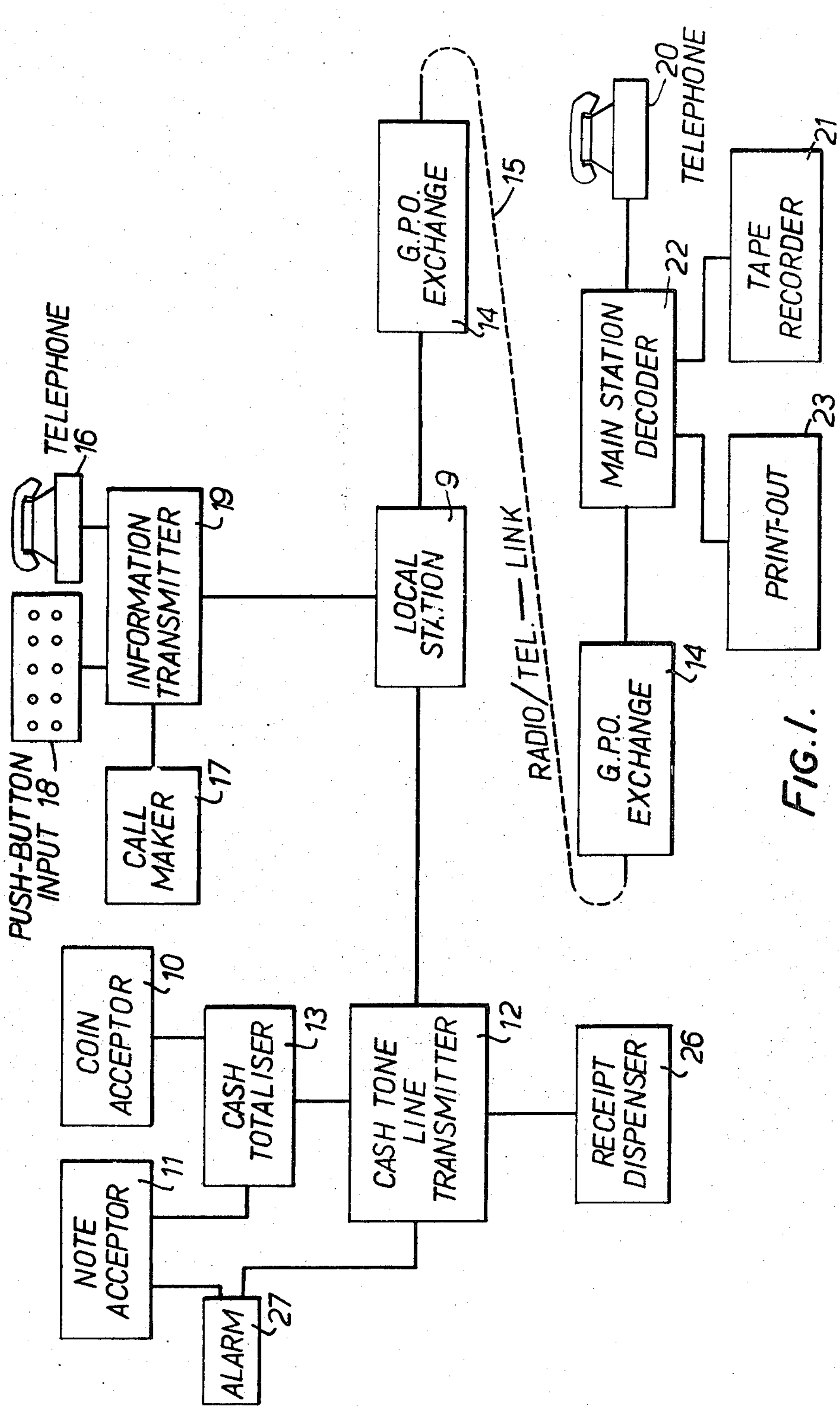
FIG. 1 is a schematic diagram illustrating the main components of a remote bet placing system to which the invention may be applied.

In the system illustrated in FIG. 1 the apparatus comprises a number of local stations, each somewhat resembling a conventional telephone booth, and each situated for example in a club, office, factory, or other position available to a large number of people. Each local station is connected or connectable (e.g., through a telephone exchange) via a General Post Office or private telephone link to a main receiving station which may be situated in a large betting office and linked similarly to all the local stations.

As illustrated by the block diagrams in FIG. 1 the apparatus at each local station 9 comprises a coin acceptor 10, and a bank note acceptor 11, both linked to electrical telemetry equipment including a cash tone line transmitter 12 which may be of generally conventional type as used for example in General Post Office cash operated telephones, and will therefore not be described in detail. The coin acceptor 10 may be arranged to accept for example 50 cent, 10 cent and 5 cent coins and to produce pulses corresponding to the number and denomination of the coins inserted. The acceptor may include any conventional devices for checking the size, weight, and composition of the coins and rejecting any coin below standard. The note acceptor 11 likewise may be of any conventional type, preferably of the type manufactured by De La Rue Limited. The local station may also include a total cash calculator 13, arranged to add the individual cash values received from the coin and note acceptors 10,11, and to provide a sum total signal to the cash tone generator or line transmitter 12.

The telemetry equipment is arranged to encode the pulsed information from the coin and note acceptors 10,11, or the totaliser 13, and to generate a signal or series of signals which may be in the form of one or more tones, to be transmitted to the main office over the connecting line from the local station, via a transmitter link 15, (which may be a telephone line, microwave radio link, or any other method of telecommunication).

The local station also includes a telephone instrument 16, including a conventional hand set by which the punter can converse with an operator at the main station in order to transmit information regaring the bet to be placed. The telephone instrument may include a conventional rotary G.P.O. type dialling unit for transmitting a selector code number to the Post Office exchange in order to effect automatic connection of the local station initially with the main station. Alternatively or in addition the telephone instrument may include an automatic call maker 17 of the type arranged to receive a punched card and to connect the two stations automatically through the exchange. Instead of a card call maker a push button type call maker 18 may also be used. In any case the telephone instrument preferably includes an automatic control circuit 19 including a switch device arranged to de-energise the telephone receiver, or disconnect the receiver from the telemetry circuit, when the cash tone line transmitter 12 is in operation, so that the punter will not be able to hear the cash tones. This may be of value in reducing the risk of any attempts to counterfeit the cash tones in order to provide false information regarding the amount of money inserted.

The link 15 between the local station and the main station may be of various types. The link may for example be a standard G.P.O. line through telephone exchange 14, using lines or microwave radio links. Alternatively the link may be a private line, or a private microwave circuit.

The main station will normally include a decoder 22, compatible with the tone generator or encoder 12, and a telephone instrument 20 for use by a receiving clerk, together with an automatic tape-recorder 21 for recording each conversation and further information such as the cash tones. In addition, or alternatively, the main station may include an automatic cash signal decoder, compatible with the cash tone transmitter, and a print-out mechanism 23 for providing a printed record of each transaction.

In a possible alternative the local station has no telephone instrument and instead is provided with a dial or button push input unit for transmitting essential information regarding the bet. For example, the information may be translated by the punter into numerical values in accordance with a simple code, and these numerical values entered in the input unit via mechanical buttons or dials similar to those of the unit 18. In such a case the main station likewise will not be provided with a telephone instrument but simply with automatic receiving and recording or print-out equipment.

The local station may also include an automatic dispenser 26 for tickets or receipts. The receipts may be numbered consecutively, with or without the value of the bet and other particulars, and the dispenser may be actuated by a return signal from the main station on the completion of each transaction, or alternatively the dispenser may be arranged to issue the ticket automatically in response to an energising signal from the note and cash acceptors 10, 11, possibly coupled with a manual dispenser button which will be pressed by the punter on the completion of the bet. The local station also preferably includes an alarm circuit 27, associated with the note and cash acceptors to warn of any attempt to interfere with the proper operation of the equipment.

Figure 2:
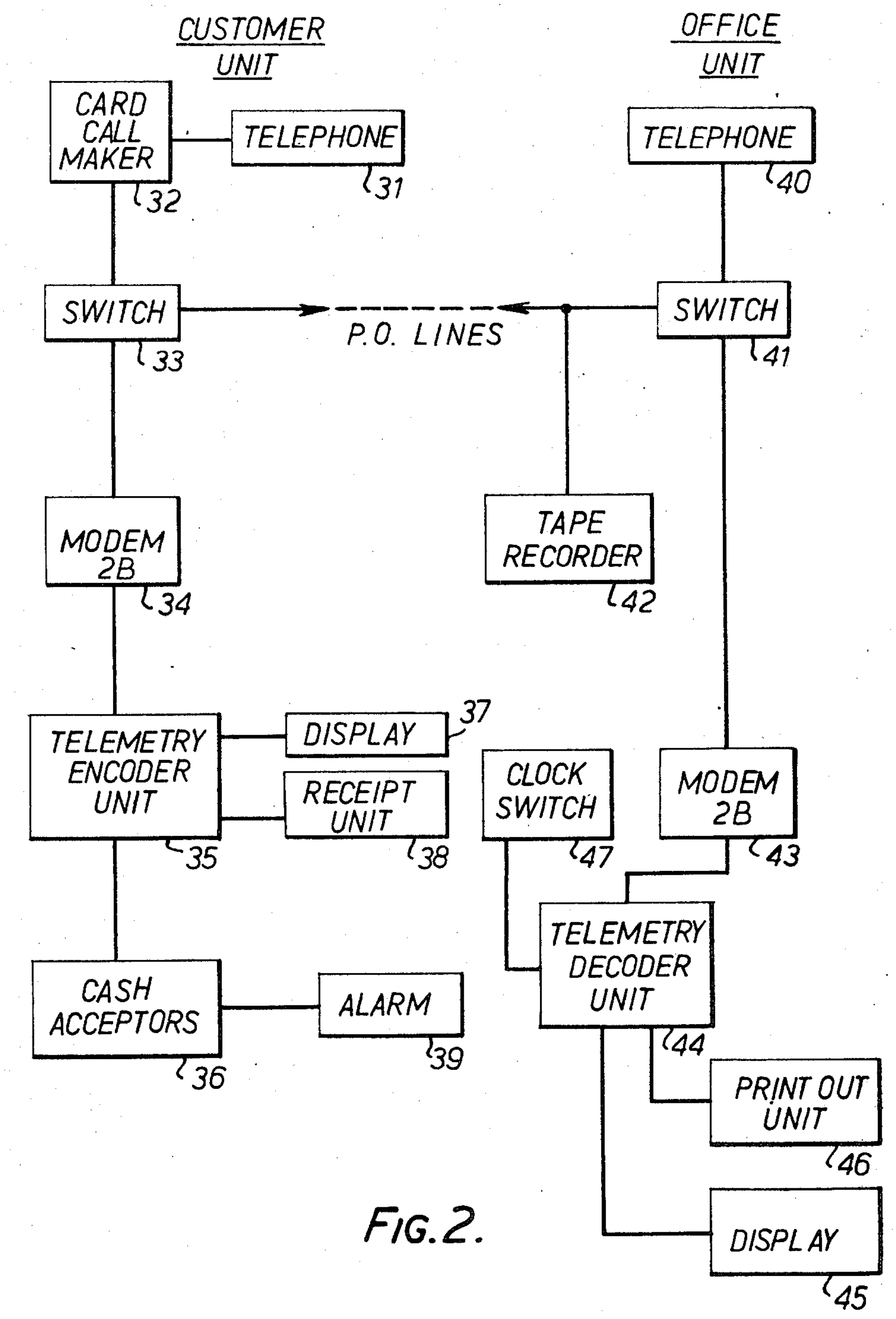
FIG. 2 is a schematic diagram illustrating the basic design of a particularly preferred form of the invention.
Figure 3:
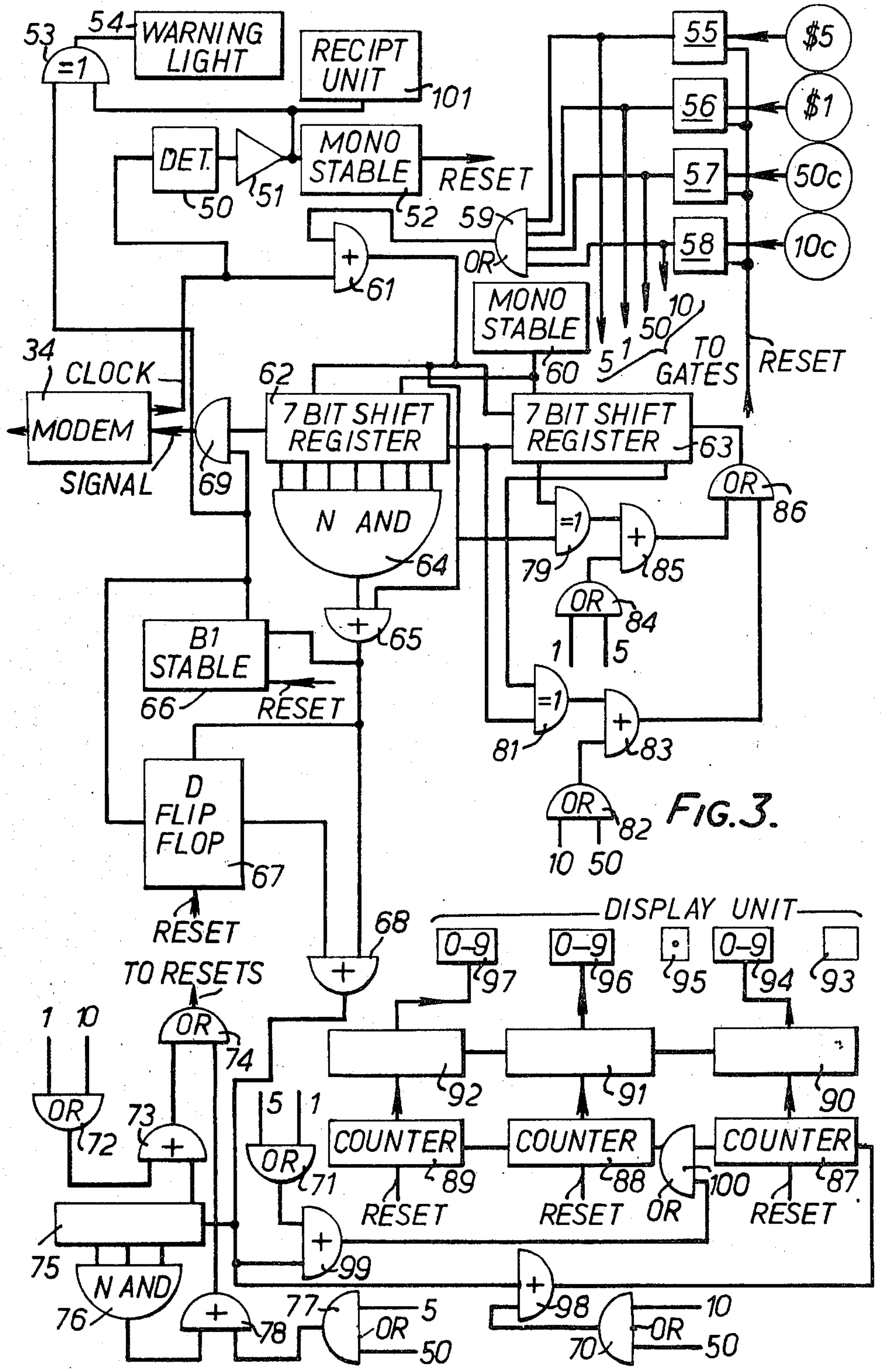
FIGS. 3 and 4 are more detailed circular diagrams illustrating the construction of the decoder and encoder units in the system of FIG. 2.
Figure 4:
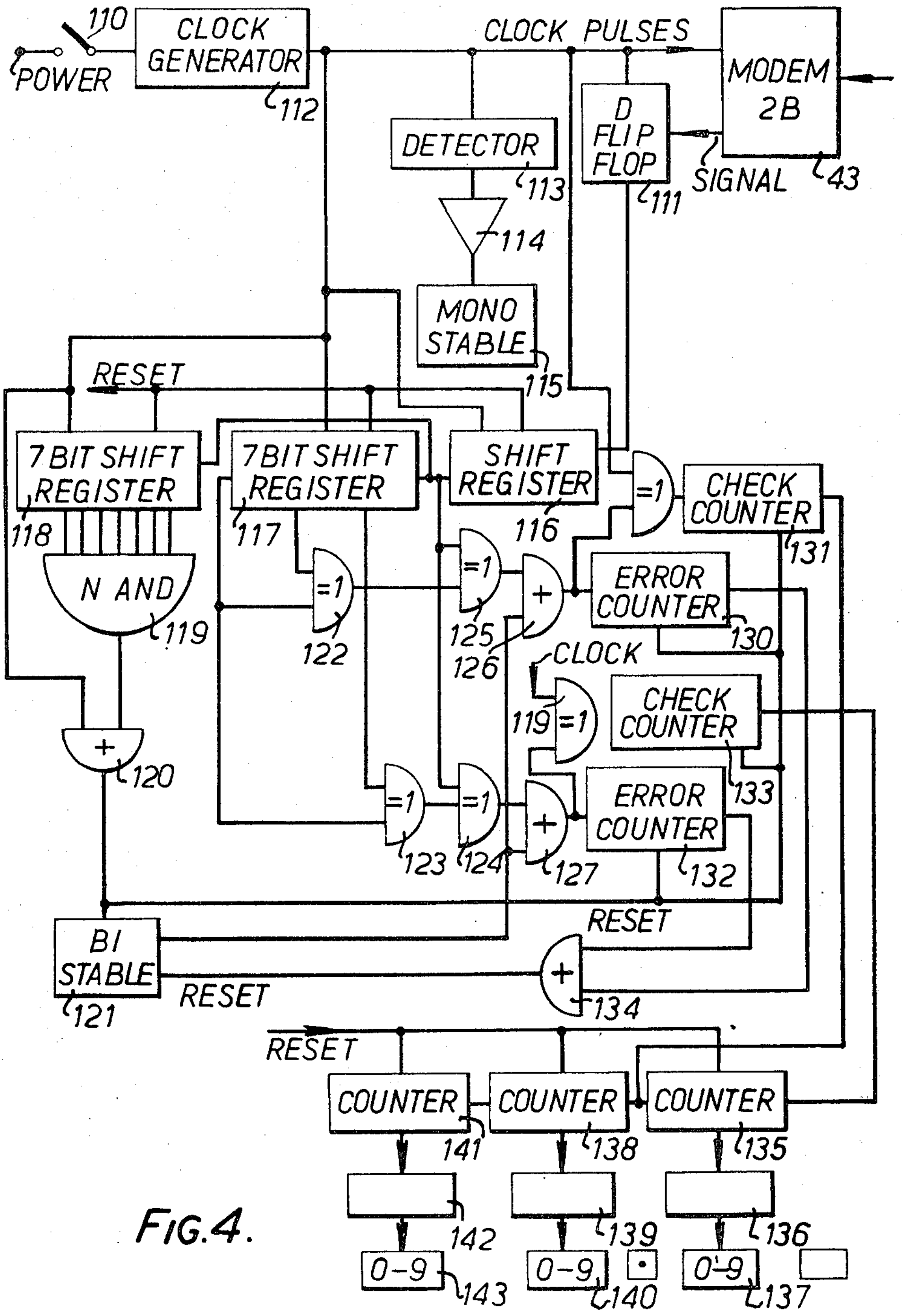

The embodiment of the invention illustrated in FIGS. 2, 3 and 4, also comprises a local station or customer unit and a main station or office unit as shown on the left and right sides of FIG. 2 and connected preferably by the public telephone network. The equipment itself is best understood by describing the sequence of operation with reference to FIG. 2. The operation commences by the customer lifting the handset of the local telephone instrument 31 and making a call to the main station either by conventional dialling means or preferably by means of a card caller 32 so that unauthorised use of the telephone is avoided. When the operator in the main office answers by lifting the telephone handset 40 he will also switch on (automatically) the tape recorder 42 so as to record the details of the transaction. The customer will then inform the operator/clerk of the details of the transaction including his/her name and account details where applicable. When the operator is satiisfied that all necessary details have been given the customer will be told to press switch 33. This will disconnect the telephone 31 from the Post Office line and replace it with the "Modem" unit 32. Modem" units (modulator demodulator units) are well known and already in widespread use for various telecommunication purposes, and it is unnecessary to provide a detailed description here. Basically the circuits produce audio tones which are frequency modulated in response to the signals fed to the unit. When the operator/clerk hears the tone from the Modem 34 on his telephone 40 he will operate switch 41 thus connecting the other Modem unit 43 to the Post Office line, and the apparatus is now in a condition ready to accept and recognise the coded signals from the cash acceptor units 36.

The customer unit will preferably have a display unit 37 with a light indicating that it is ready to accept cash. This light will be operated by the receipt of "clock" pulses originating from the office unit. The operator at the main station next closes a switch 47 thus sending "clock" signals generated by a telemetry decoder unit 44 to the customer unit via the Modem 43, the Post Office lines or other communication network, and the Modem 34 into the local telemetry unit 35 which "recognises" the clock pulses and causes the indicator light on the display 37 to operate. The clock pulses also provide essential timing information for the telemetry system.

The customer now places coins or notes into the appropriate cash acceptor units 36 one at a time. As each coin or note is inserted the indicator light in display 37 will go out briefly, and the customer may insert further coins or notes when the light comes on again. In an alternative form of the apparatus the coins or notes may be inserted in rapid succession and the telemetry unit has a small memory or digital information store which will store the information regarding the number and denominations of coins or notes and encode it for sequential transmission.

On acceptance of the note or coin by the cash acceptors 36 an appropriate signal is sent to the telemetry unit 35. This unit will generate a special coded signal approprite to either dollars or cents for example. The code signal is repeated as often as necessary to denote coins or notes of differing denominations. The telemetry unit also "counts" the total sum of money inserted and dispays this as a decimal number of dollars or cents through the display unit 37.

The coded signals from the telemetry unit 35 are passed to the Modem unit 34 and transmitted over the telephone network to the Modem 43 from where they pass into the telemetry decoding unit 44. The signals are then decoded and used to operate a display unit 45 and a printout unit 46 if a hard copy version is required.

At the end of the cash transaction the operator switches off the clock switch 47. The cessation of these signals is noted by the telemtry unit 35 and causes a receipt unit 38 to issue a receipt if required. Alternatively the receipt can be issued by the customer pressing a button on the customer unit if so desired.

A number of safety features are preferably included in the apparatus, in order to safeguard against improper use of the equipment. An alarm 39 may be incorporated which will operate locally or remotely by standard means if the equipment is tampered with. A further feature of the apparatus is the telemetry encoding and decoding units 35, 44 which provide a very high degree of immunity from malfunction due either to "noisy" connections in the telephone network or attempts to counterfeit the cash signals.

The design and construction of the telemetry encoding and decoding system is best understood by describing the operating sequences with reference to FIGS. 3 and 4.

On receipt of the clock signal from the Modem 34 a detector 50 and an amplifier 51 provide a signal which operates a monostable multivibrator 52 which produces a reset pulse setting all the appropriate circuits to a quiescent condition ready for insertion of cash. At this time there is no output from bistable 66 and hence the exclusive OR gate 53 will produce an output causing the warning light 54 to operate, indicating that cash (or further cash) may be inserted. At this time the signal fed into the Modem 34 from the gate 69 will be in the logical '0' state.

When a coin or note is inserted into the cash then unit 36 a voltage will be produced from the appropriate terminal according to the denomination of the coin or note. This voltage will cause one of the bistables 55, 56, 57 or 58 to operate. The signal from this bistable will operate several OR gates according to the value of the cash inserted. If for example the cash acceptor unit is designed to handle 10 cents, 50 cents, $1 and $5, then for a 10 cent coin OR gates 59, 82, 70 and 72 will operate. For a 50 cent coin, OR gates 59, 82, 70 and 77 will operate. For a $1 note, OR gates 59, 84, 71 and 72 will operate and for a $5 note, OR gates 79, 84, 71 and 77 will operate. On receipt of a signal from the 10 cent coin acceptor unit the OR gate 59 will pass a signal to the AND gate 61 thus enabling the clock pulses to operate the shift registers 63 and 62. These shift registers are shown as 7 bit shift registers but in principle they can be more or less than this without affecting the basic method of operation. Using a 7 bit shift register with feedback via the exclusive OR gates 79 and 81 and AND gates 83 or 85 and the OR gate enables a digital code of 127 bits to be generated. By varying the position of the taps on the shift register different codes can be generated, each one being 127 bits long. In this system as described one code is allocated to dollars and one to cents. The particular codes used may be chosen by varying the position and number of taps used and so long as a similar choice is made at the operator/clerk's unit the system will behave properly.

A feature of all the codes generated by such a feedback shift register is that they contain a sequence of digital 1s equal to the number of stages in the register.

The code is generated by the shift register 63 in combination with the gates 79, 81, 82, 83, 84, 85, 86, as shown in FIG. 3. When the seven consecutive 1s are in the shift register 62 the NAND gate 64 sets the bistable 66 via the AND gate 65. The signal from the shift register 62 is then connected to the Modem 34 by the gate 69 and transmitted to the main station unit for a certain time. The output from the bistable 66 is also fed to the D flip-flop 67 which also receives a signal from the AND gate 65. The output from 67 goes to logical 1 on the back edge of the clock pulse signal and hence no signal appears at the output of AND gate 68 at the beginning of the coded signal train. However after 127 bits of code have been transmitted the 7 consecutive logical "one" state will recur and this signal will pass through AND gates 65 and 68 from NAND gate 64 to the counter 75 and to the counter 87.

Since a 10cent coin was postulated OR gate 72 will operate and the 1 output from counter 75 will pass through AND gate 73 and OR gate 74 to reset the bistables 66 and 58 and D flip-flop 67 and counter 75. The signal train from gate 69 will now cease and the shift register 63 will stop running since the input to the OR gate 59 has been removed by the reset pulse from OR gate 74 having reset the bistable 58.

The pulse from AND gate 68 was also connected to the counter 87 and that counter will retain its count this being displayed on the numeric display unit 94 fed by the converter unit 90.

If the coin inserted had been a 50cent coin the the code sequence would have repeated 5 times until the counter 75 had indicated a count of 5. This would operate NAND gate 76 and a signal would operate the reset via OR gate 74, AND gate 78 and OR gate 77.

For a 1 or 5 dollar note signal the code is changed by operation of OR gate 84 instead of gate 82 and the signal to the display unit from AND gate 68 is fed by OR gate 71 and AND gate 99 to OR gate 100 so as to register directly in dollars instead of cents. As before the code is sent once for a 1 dollar note and five times for a 5 dollar note.

All these coded signals are passed to the local Modem unit 34 as before and decoded by the Modem unit 44 in the main office.

The cessation of clock signals may be detected by units 50, 51 and 101 and used to issue a receipt if required. The receipt unit 101 can receive its signals from the counters 87, 88, 89 at the completion of the transaction or serially as the cash is inserted directly from the cash acceptor units.

On receipt of an incoming call at the office unit (see FIG. 4) the operator/clerk will answer the telephone 40 in the normal way and make a note of the details of the transaction, and the conversation may be recorded together with the subsequent data by the tape recorder 42. When the customer is ready to insert cash, the operator/clerk will operate the switch 41 which may be incorporated in the telephone 40 as may the switch 33 at the customer unit. After the switches or press buttons 41 and 33 have been operated the Modem units 43 and 34 are conditioned to exchange data from the telemetry units 44 and 35. At each Modem unit, an interface unit may be provided to provide appropriate signal levels and isolation as may be required by the Post Office between the Modems and the telemetry units.

When the switch 110 is operated the clock signals are fed to the Modem unit 43 and sent over the Post Office network in frequency modulated form to the customer unit for use in the telemetry unit 35. The clock signals generated by the square wave oscillator 112 are detected and amplified by the units 113, 114 and trigger a monostable 115 which resets the bistable 121, the shift registers 116, 117, 118, and the counter units 130, 131, 132, 133, 135, 138 and 141.

The incoming data signals are 'reclocked' by the D flip-flop 111 and fed to the shift register 116 and from there to the shift rgisters 117 and 118 (shown as 7 stage shift registers as in the customer unit for the purposes of explanation).

As already described the first part of the coded cash signal consists of seven binary 1 signals: when these are received the NAND gate 119 sets the bistable 121 via the AND gate 120. The coded signal in shift register 117 is now compared bit by bit with the signal in shift register 116 by means of the exclusive OR gates 122, 125 and 123, 124. Since the taps on the shift register 117 are identical with those on the shift register 63 in the customer unit then the code output of exclusive OR gate 122 will be the same as the incoming code in 116 if a note has been inserted and the exclusive OR gate 125 will produce no output to the AND gate 126.

Similarly if a coin has been inserted by the customer the exclusive OR gate 123 will produce the same code as in shift register 116 and exclusive OR gate 124 will produce no output to the AND gate 127.

The AND gates 127 and 126 pass their signals to the counters 130, 131, 132, and 133 if the bistable 121 is operated. As already described if a note has been inserted (e.g., $1, $5) then AND gate 126 will be producing no output and error counter 130 will not receive any input. The check counter 131 will receive signals however since an exclusive OR gate is connected between AND gate 126 and 131. At the end of the first 127 bit sequence (or slightly earlier to allow for occasional errors due to noise etc., on the Post Office line) the check counter 131 will send a signal to the counter 138 in the display 45 and also if required to the print out unit 46. At the end of the 127 bit sequence a further consecutive digital one signals will occur and operate NAND gate 119 and AND gate 120 and thus reset the counters 130, 131, 132 and 133. If the note inserted was a $5 the sequence will repeat 5 times registering $5 in counter 138. If the note inserted was a $1 then the input sequence will end.

An error count will build up in the counters 130, 132 due to the fact that when 7 consecutive digital 1 signals are detected at the sending end, no more pulses are fed out. Therefore, as the shift register at the receiving end (decoder unit) is 14 bits long (assuming shift register 116 is a 7 bit register), the number in register 117 will be the same as existed in the sending end (encoder unit), 14 pulses before the 7 consecutive digital ones were detected. The output of shift register 116 will start to be in error, 7 clock pulses later. The number of error pulses before the shift register ends up at "all noughts," will be determined by the code generated, and whether dollars or cents code is received. Once "all noughts" are in the shift register, then no more errors can be detected.

It should also be noted that, depending upon the "taps" used on the encoder shift register, the length of the code chain generated before 7 ones occur can be lower than 127 bits. Also, if a block of 7 digits is examined in the cents code, it will be found that the same 7 bits will occur some time during the dollars code. Hence, even though the "dollar" check counter 131 is receiving pulses when a dollar code exists, some counts will be fed into check counter 133 and vice versa. Therefore, there is not only a higher limit for the detection of the outputs of counters 130 and 132 but there is also a lower limit.

After a suitable number of error bits have been observed the AND gate 134 will operate and reset the bistable 121 thus inhibiting further signals from reaching the counters via AND gates 126 and 127. The same inhibit operation will occur if a false code is received or one incorrectly timed thus making counterfeit operation most difficult. In the event of a coin being inserted check counter 133 will operate and pass signals to counter 135 and to print out unit 46 for each unit of 10c inserted. The interface units 136, 139, 142 convert the signals in the counters 135, 138, 141 respectively to a form acceptable to the display units 137, 140, 143 as in the customer unit display. Thus the total cash inserted is displayed and passed to the print out unit as required.

At the end of the data transmission the customer can recall the operator by operating switch 33 and so conclude the transaction. The cessation of clock signals which will cause or permit a receipt to be issued to the customer from unit 38 will also occur if the line should become disconnected. This will then permit the customer to obtain a receipt for money inserted should he be unable to continue with the call at the time.

I claim:

1. The combination of apparatus for enabling monetary transactions to be transmitted from a plurality of local stations to a main station and recorded thereat, wherein each local station apparatus comprises a cash accepting and validating device, an encoding signal generator arranged to produce a different coded signal sequence for each cash value registered by the cash accepting and validating device, wherein the main station apparatus incorporates a synchronising signal generator for producing clock pulses to be passed to the local station to initiate and control the timing of the signal sequence from the encoding signal generator, an information transmitter arranged for transmitting the signal sequence produced by the encoding signal generator to the main station, and wherein the main station further includes a decoder controlled by the clock pulses produced by the synchronising signal generator for receiving the signal sequence produced by the information transmitter and decoding that sequence when the signal sequence is substantially synchronised with the clock pulses, and a data recording device controlled by the decoder.

2. Apparatus according to claim 1, wherein the main station apparatus incorporates an error detector for registering deliberate or unexpected errors in the coded signal sequence and arranged to reset the decoder when a predetermined error count is achieved.

3. Apparatus according to claim 1, wherein the synchronising signal generator is adapted to produce signals for controlling the acceptance or rejection of cash inserted into the cash acceptor device of a local station apparatus.

4. Apparatus according to claim 1 including interface circuits between the information transmitter and the output of each local station appratus and between the output means and the synchronising signal generator of the main station apparatus, for protection of the communications links from excess voltage or current transients.

5. Apparatus according to claim 1 wherein each local station apparatus includes a frequency modulator for converting information or other signals into frequency modulated signals to be transmitted to the main station, and the main station includes a compatible demodulator.

6. Apparatus according to claim 1 wherein the cash acceptor includes a bank note acceptor.

7. Apparatus according to claim 1 including a cash totaliser arranged to sum the value of the cash accepted to produce a total cash signal from the encoding signal generator.

8. Apparatus as claimed in claim 1, wherein the local station includes an automatic dialling code signal generator, for connection of the local station to the main station.

9. Apparatus as claimed in claim 1 wherein the information transmitter includes a telephone receiver and microphone combination.

10. Apparatus according to claim 9, including means for automatically de-energising any predetermined part of said combination when the encoding signal generator is in operation.

11. Apparatus according to claim 1, wherein the local station includes an information signal generator for transmitting information other than the cash value regarding the transaction.

12. Apparatus as claimed in claim 1, wherein the local station includes a dispenser for receipts, and means for energising or controlling the dispenser in response to a transaction signal transmitted thereto.

13. Apparatus as claimed in claim 1, wherein the local station includes an alarm system, a detector at the local station and coupling means to couple the alarm system to the detector and provide an alarm signal if an unauthorised attempt is made to open the cash section of the cash acceptor.

* * * * *